Patented Apr. 24, 1945

2,374,418

UNITED STATES PATENT OFFICE 2,374,418

PROCESS OF SEPARATING 3-PICOLINE, 4-PICOLINE, AND 2,6-LUTIDINE

Francis E. Cislak, Indianapolis, and Orin D. Cunningham, Speedway City, Ind., assignors to Reilly Tar & Chemical Corporation, Indianapolis, Ind., a corporation of Indiana No Drawing. Application December 20, 1941, Serial No. 423,790

14 Claims. (Cl. 260—290)

Our invention relates to the separation of 3-picoline, 4-picoline, and 2,6-lutidine from one another.

These three compounds, 3-picoline, 4-picoline, and 2,6-lutidine, are commonly associated with one another as ordinarily prepared from coal tar. But they are difficult to separate one from another, because their properties are closely alike; especially their boiling points, so that separating them by fractional distillation is very difficult. All three of these compounds boil at very nearly the same temperature—about 143–144° C.

We have found, contrary to what might be expected, that the hydrohalides of 3-picoline, 4-picoline, and 2,6-lutidine are distillable; that if in a mixture of two or all three of these compounds we convert them into their respective hydrohalides, we obtain a fairly wide separation of boiling points; and that the resultant mixture of these hydrohalides is readily separable by fractional distillation on account of that relatively large difference in boiling points. After that separation, the separated hydrohalides may if desired be separately reconverted in any suitable manner into the bases from which they were derived, as by treatment with an alkali-metal hydroxide or ammonia.

The relatively wide difference in the boiling points of the hydrohalides is exemplified by the hydrochlorides, the most convenient ones to use. These are about as follows:

3-picoline hydrochloride, approximately 233° C.

4-picoline hydrochloride, approximately 240° C.

2,6-lutidine hydrochloride, approximately 245° C.

The boiling points of the several hydrofluorides, the several hydrobromides, and the several hydriodides differ among themselves in much the same manner; and in each case materially more widely than do the boiling points of the three bases.

We can use our process of separation to separate mixtures of any two of the three bases, as well as mixtures of all three. In each instance, the mixture, whether of two of three components, is treated with a hydrogen halide, to convert the bases in the mixture into their hydrohalides; then the mixture of hydrohalides is subjected to fractional distillation, to separate the component hydrohalides by reason of their differences in boiling point; and then, if desired, any or all of the separated hydrohalides may be reconverted into the bases from which they came, in any suitable manner.

The equipment, and more especially the still and the fractionating column, should be resistant to the attack of the hydrohalides.

In converting the mixture of bases into the hydrohalides, we may use either aqueous solutions of the desired hydrogen halide, or the hydrogen halides themselves. For instance, if we convert the bases into hydrochlorides, which are the hydrohalides we prefer for convenience, we may treat the mixture of bases with aqueous hydrochloric acid, or may bubble gaseous hydrogen chloride through such mixture.

The following are examples of our process:

*Example 1.*—Ninety-three grams (1 mole) of a mixture containing approximately 45% of 3-picoline and 55% of 4-picoline is reacted with 36 g. (1 mole) of hydrogen chloride; to produce a mixture of the hydrochlorides of 3-picoline and 4-picoline. This mixture of hydrochlorides is subjected to fractional distillation, through an efficient fractionating column, to obtain first the 3-picoline hydrochloride boiling at about 233° C. and later the 4-picoline hydrochloride boiling at about 240° C. These separated hydrochlorides or either of them may be separately treated to reconstitute the respective bases, 3-picoline and 4-picoline, in any convenient manner, most conveniently by treatment with caustic soda. If caustic soda is used, it is desirably fairly concentrated, say about 50% or more. The freed separated picolines thus obtained are usually of a purity of 90% or better for both 3-picoline and 4-picoline.

*Example 2.*—Example 1 is repeated, save that instead of using a mole of hydrogen chloride we use a mole of hydrogen bromide. Specifically, 93 grams (1 mole) of a mixture containing approximately 62% of 3-picoline and 38% of 4-picoline is reacted with 81 grams (1 mole) of hydrogen bromide. The resultant mixture of hydrobromides is subjected to fractional distillation through an efficient fractionating column, to obtain first the 3-picoline hydrobromide, which boils at about 329° C., and then the 4-picoline hydrobromide, which boils at about 335° C. The two separated picoline hydrobromides may be separately treated to reconstitute the respective bases, as by treatment with caustic soda as in Example 1. The 3-picoline thus obtained is of about 94 to 96% purity; and the 4-picoline thus obtained is of over 90% purity.

*Example 3.*—The procedures of Examples 1 and 2 are repeated, save that hydrogen iodide is used in place of the hydrogen chloride of Example 1 and the hydrogen bromide of Example 2.

*Example 4.*—The procedures of Examples 1, 2 and 3 are repeated, save that the hydrogen halide used is hydrogen fluoride.

*Example 5.*—About 97.4 g. (about 1 mole of total base) of a mixture containing approximately 39% of 3-picoline, 38% of 2,6-lutidine, and 23% of 4-picoline, is reacted with about 95 g. of concentrated aqueous hydrochloric acid (about 37–38%)—about 1 mole in terms of the acid itself. This converts all three bases into their hydrochlorides. The water is separated from the mixture of hydrochlorides, as by distillation or evaporation; and then the remaining mixture of hydrochlorides is separated into its component hydrochlorides through an efficient fractionating column. The 3-picoline hydrochloride passes over first, then the 4-picoline hydrochloride, and finally the 2,6-lutidine hydrochloride, by reason of their successively higher boiling points in the order named. The three separated hydrochlorides may then if desired be reconverted into the bases from which they were derived, as by treatment with caustic soda or ammonia or other strong base. The 3-picoline thus obtained is ordinarily of about 95% purity, the 4-picoline of about 90% purity, and the 2,6-lutidine of between 80 and 90% purity.

In the foregoing examples we have contemplated using a fractionating column of rather high efficiency. But the difference in boiling points among the different hydrohalides of 3-picoline, 4-picoline, and 2,6-lutidine is sufficient that high efficiency in a fractionating column is not essential if high purities of the separated components is not important. Indeed, the differences in boiling points are such that fair separations can be obtained in ordinary distillation apparatus.

We claim as our invention:

1. The process of separating a mixture containing two or more of the bases 3-picoline, 4-picoline, and 2,6-lutidine, which consists in converting the bases in the mixture into their hydrohalides, and separating the hydrohalides by fractional distillation.

2. The process of separating a mixture containing two or more of the bases 3-picoline, 4-picoline, and 2,6-lutidine, which consists in converting the bases in the mixture into their hydrohalides, separating the hydrohalides by fractional distillation, and reconverting the separated hydrohalides into the respective bases from which they were derived.

3. In the process of obtaining the separate components of a mixture containing two or more of the bases 3-picoline, 4-picoline, and 2,6-lutidine, the step of fractionally distilling a mixture of the hydrohalides of said bases.

4. The process as set forth in claim 1, in which the hydrohalides into which the bases are converted are hydrochlorides.

5. The process as set forth in claim 2, in which the hydrohalides into which the bases are converted are hydrochlorides.

6. The process step as set forth in claim 3, in which the hydrohalides which are distilled are hydrochlorides.

7. The process as set forth in claim 1, in which the hydrohalides into which the bases are converted are hydrobromides.

8. The process as set forth in claim 2, in which the hydrohalides into which the bases are converted are hydrobromides.

9. The process step as set forth in claim 3, in which the hydrohalides which are distilled are hydrobromides.

10. The process as set forth in claim 1, in which the hydrohalides into which the bases are converted are hydrofluorides.

11. The process as set forth in claim 2, in which the hydrohalides into which the bases are converted are hydrofluorides.

12. The process step as set forth in claim 3, in which the hydrohalides which are distilled are hydrofluorides.

13. In a process of separating 3-picoline from a mixture consisting essentially of this base and at least one of the bases 4-picoline and 2,6-lutidine, the step which comprises forming hydrochlorides of the bases in the mixture, and fractionally distilling the hydrochlorides to separate a distillate fraction enriched in 3-picoline hydrochloride.

14. The process for the production of 3-picoline from a mixture of coal-tar bases consisting essentially of 3-picoline and at least one of the bases 4-picoline and 2,6-lutidine, which comprises separating such a mixture from coal tar by fractional distillation, treating this mixture with sufficient hydrochloric acid to convert all these bases to their hydrochlorides, subjecting the resulting mixture of hydrochlorides to fractional distillation to separate out a distillate enriched in 3-picoline hydrochloride, and treating the 3-picoline hydrochloride thus obtained with alkali to obtain 3-picoline.

FRANCIS E. CISLAK.
ORIN D. CUNNINGHAM.